A. DRUMM.
HORSE HAY FORK.
APPLICATION FILED MAY 1, 1913.
1,097,853.
Patented May 26, 1914.
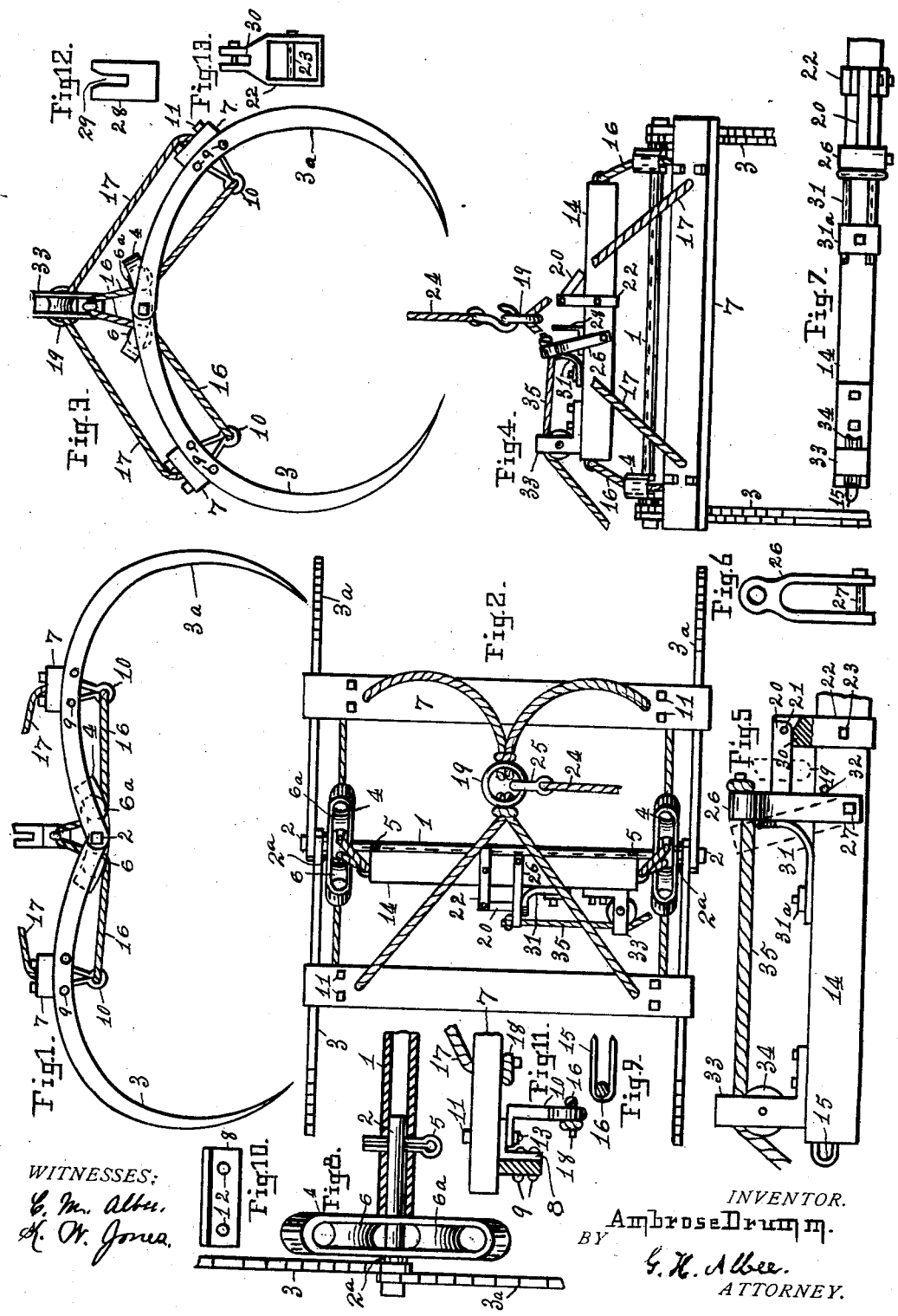

UNITED STATES PATENT OFFICE.

AMBROSE DRUMM, OF BRILLION, WISCONSIN.

HORSE HAY-FORK.

1,097,853.  Specification of Letters Patent. Patented May 26, 1914.

Application filed May 1, 1913. Serial No. 764,838.

*To all whom it may concern:*

Be it known that I, AMBROSE DRUMM, a citizen of the United States, residing at Brillion, in the county of Calumet and State of Wisconsin, have invented a new and useful Horse Hay-Fork, of which the following is a specification.

My invention relates to a well known farm implement in which the improvement consists in such an arrangement of ropes for acting upon the fork tines that when the lifting rope is connected with the fork tines for lifting and carrying the load to the place of deposit, the tines will be compressed upon the hay held by them until the lifting rope is released therefrom, and when the lifting rope is disconnected from the fork lifting bar the ropes will act to separate the points of the tines and let the hay drop from them, the improvement being shown in the accompanying drawing, in which,—

Figure 1 is an end elevation of the fork, it being opened ready for use in its insertion into the hay. Fig. 2 is a plan of the fork opened as in Fig. 1, with its lifting rope not pulling upon the fork, its lifting bar lying flatwise. Fig. 3 is an end view of the fork closed about as it will be with a quantity of hay between the fork tines. Fig. 4 is a side elevation of the fork when closed as in Fig. 3, the ends of the tines being broken. Fig. 5 is a side elevation of the fork lifting rope latch and its rope tripping mechanism, which figure, with the following ones are upon an enlarged scale. Fig. 6 is an end elevation of the latch catch loop. Fig. 7 is a plan of a fragment of the lifting bar with the lifting rope latch in its supporting post, its catch, and a spring for normally holding the latch closed, and a sheave near one end of the bar over which to run the tripping rope for disconnecting the latch. Fig. 8 is a plan of a fragment of one pair of fork tines, a horizontal section of a tubular rod fragment which connects the two pairs of fork tines, and a plan of a sheave pulley carrying loop which is pivotally mounted upon a bolt which is detachably connected with the aforesaid tubular rod fragment. Fig. 9 is a plan of a staple whose use will be explained. Fig. 10 is a plan of an angular sheet metal piece riveted to each fork tine and bolted to a fork tine spacing strip. Fig. 11 is a fragment of an end of the aforesaid spacing strip, and showing the use of the angular piece, (Fig. 10,) and a drop bracket to which a rope is to be connected for operating the fork. Fig. 12 is an end elevation of a latch guide and support. Fig. 13 is an end elevation of a looped post in which the latch of the tripping mechanism is mounted.

Similar numerals and letters indicate like parts in the several views.

1, indicates a gas pipe rod of a length and diameter adapted for the size of fork to be made and serving as a fork connecting bar; 2, a headed bolt in each end of the pipe with their heads spaced from the ends of the pipe a suitable distance for receiving the two fork tines 3 and 3$^a$, and a sheave pulley carrying loop 4, the bolts being detachably held within the pipe ends with some suitable fastening, the cotter pin 5, serving the purpose. A washer 2$^a$, may be placed between each loop 4 and the tines. The pivotally mounted loops 4, are each provided with two sheave pulleys 6 and 6$^a$, which are mounted for revolution in their respective loops. The two pairs of fork tines are spaced apart with strips of wood, 7. Angular pieces 8 are secured to each tine with rivets 9, a drop bracket 10, (see Figs. 1, 3 and 11,) is placed under each piece 8 and two bolts 11, inserted through the angular bent arm of the bracket 10, the holes 12 in the pieces 8, and the spacing strips 7, and secured with nuts 13. These spacing strips 7, serve as a support for the operator to mount for pressing the fork tines into the hay in grasping a fork full. A lifting bar 14, is arranged above the gas pipe rod and upon this bar the lifting rope latch and its releasing mechanism is mounted. This is best shown in Figs. 5, 6 and 7. Fig. 5 shows a staple 15, driven into the end of the bar 14, for clamping a rope 16, between it and the end of the bar, the rope to extend downward, one end running around a sheave 6, (see Figs. 2 and 3,) and to the bracket 10 nearest it, and which depends from the strip 7, and the other running around the sheave 6$^a$, and then to the opposite bracket. In this manner, the ropes 16 at each end of the bar 14, connect with the two spacing strips, and the upward pull upon the bar acts to close the fork tines around the hay which may be between them. Each spacing strip is provided with a rope 17, the ends of which may be connected thereto in any suitable manner, as may the other ropes to their respective places, as by passing an end through holes and forming a knot 18 upon said end. Intermediate the ends of these two ropes 17, they are connected with a ring 19, which may be of irregular curvature if desired, which is to be engaged with the latch 20, which latch is pivotally mounted upon the pin 21 of the post 22, which post embraces the bar 14 midway its ends and is secured thereto by bolt 23. The ropes 17 may be connected with the ring 19 by doubling the rope, passing the doubled end through the ring, and inserting the two ends through the loop formed by doubling it, as is shown in Fig. 2.

The ropes before mentioned are intended to include any flexible member whether it be a rope or a chain.

A rope 24, is provided with a hook 25, for engaging the ring and lifting the fork when lifting power is applied to the rope 24. This ring member is shown in Figs. 2, 3 and 4, and a fragment of it in dotted lines in Fig. 5, and is to be engaged with the latch 20, as is shown in Figs. 3 and 5. In Fig. 4, the latch is thrown backward and the ring released from it, leaving the fork in condition for being dumped, the ropes 17 now acting to open the fork. The latch is held closed by means of the loop 26, which loop is pivotally mounted upon the bolt 27 in the bar 14. A latch guide and support, consisting of a right angled piece 28, (shown in position in Fig. 4 and in end elevation in Fig. 12,) is secured to the upper edge of the bar 14, for receiving the free end of the latch, it being held in a position parallel with the bar 14 within the slot 29, or the piece 28 may be dispensed with and the latch held up by the bottom of the slot 30, as is shown by the sectioned part of the post 22 in Fig. 5.

A spring 31, is arranged in the rear of the loop 26, for normally holding the loop in its vertical position, excepting when it is pulled backward by its trip rope. The spring is held in position by a bolt passing through the plate 31ª, which is placed across the free ends of the spring wires. A coiled or flat spring may be substituted for the spring here shown if desired.

A pin 32 may be driven into the bar 14, against which pin the loop 26 may engage and be held in a vertical position. It is to be observed that by means of a spring acting upon the loop 26 that said loop is always in its vertical position, excepting when it is pulled backward by its trip rope. Spaced from the loop 26, a post 33, is arranged and secured near the end of the bar 14, in which a sheave 34, is arranged, and a tripping rope 35, run over the sheave and to the loop 26, where it is secured as is shown in Fig. 5.

The latch and its loop 26, being in the position shown in Fig. 2, and in heavy lines in Fig. 5, the manner of operating the fork is as follows: The fork connected together as is shown in Figs. 1 and 2, and suspended from the lifting rope 24, is brought over the hay to be raised and the tines opened naturally in doing so about as is shown in Fig. 1, the operator pressing downward upon the strips 7 by standing on them if necessary for inserting the tines. When properly inserted and the rope lifting latch is engaged with the lifting rope ring, the team is started and a strain imposed upon the lifting rope, which action will force the tines into the hay upon opposite sides of the lifting bar 14, and toward each other and continue to compress the hay while being carried to the place of deposit. The tines do not require to be closed together until they meet, in order to hold the hay, as the ropes 16, are continuously pulling the opposite pairs of tines toward each other all of the time that the lifting rope is engaged in raising and carrying the load. Upon arriving at the place of deposit the team is stopped and the trip rope 35 given a pull, which act will release the latch, letting the fork open when the strain upon the lifting rope 24 is transferred from the ropes 16 to the ropes 17. The strain upon the rope 24 of the weight of the fork being still retained, the tines will be opened to their full extent as in Fig. 1, while the fork is being returned for another load, which having been obtained as before, the lifting ring 19 is again coupled to the latch 20 as before described, and the operation repeated.

Having described my invention, what I claim and desire to secure by Letters Patent, is,—

1. In a hay lifting and carrying fork, two pairs of tines pivotally mounted near each end of the tines upon a suitable bar, a sheave pulley mounted for revolution each side of the aforesaid bar in a suitable support, a spacing strip secured to one tine of each pair upon opposite sides of said connecting bar and spacing the pairs of tines apart intermediate their ends, a lifting bar arranged parallel with said connecting bar of substantially equal length therewith, a latch normally closed mounted pivotally upon said lifting bar intermediate the ends of said bar, a lifting rope ring detachably connected with said latch, a lifting rope arranged for raising and carrying the fork when power is applied thereto, a rope extending from near the end of the inside of each spacing strip around a sheave between the spacing strip and connecting bar and connecting with an end of said lifting bar, and being adapted to close the tines toward each other when a strain is applied to said lifting rope and to hold the hay compressed between the tines during the lifting and carrying of said fork.

2. In a hay lifting and carrying fork, two pairs of fork tines pivotally mounted near one end of the tines upon a suitable connecting bar, one pair near each end thereof, a sheave pulley arranged for revolution in a suitable support each side of said connecting bar near each end thereof, a spacing strip secured to one tine of each pair and spacing the pairs apart upon opposite sides of the connecting bar, a lifting bar arranged parallel with said connecting bar of substantially equal length therewith, a latch pivotally mounted above said lifting bar intermediate the ends of said lifting bar, a lifting rope ring arranged for detachable connection with said latch, a latch releasing device having a trip rope connected thereto, a rope extending from the inner side of each spacing strip around a sheave pulley and connecting with an end of said lifting bar at each end thereof, and a rope extending from the outer side of each spacing strip and connected to said lifting rope ring.

3. In a horse hay lifting and carrying fork, in combination, a tubular spacing bar, a headed bolt detachably secured in each end of said spacing bar with its head spaced from said end, two fork tines pivoted near one end of each, upon each bolt adjoining its head, a loop pivotally mounted upon each bolt between said tines and the ends of the spacing bar, and a sheave pulley pivotally mounted on opposite sides of the pivot bolt in each loop.

4. In a horse hay lifting and carrying fork, two pairs of fork tines, spacing strips between said two pairs, ropes connecting the two spacing strips, a lifting bar, ropes connecting said spacing strips and lifting bar, a latch pivotally mounted upon said lifting bar, a spring arranged for normally holding the latch closed, ropes connecting the spacing strip upon one pair of fork tines with the spacing strip upon the other pair and arranged for connection with said latch, a lifting rope arranged for detachable connection with the aforesaid spacing strip ropes and a trip rope arranged for disconnecting the fork tine spacing strip ropes aforesaid from said latch.

AMBROSE DRUMM.

Witnesses:
Mrs. K. A. PICKERT,
C. M. ALBEE.